United States Patent
Chao et al.

(10) Patent No.: US 12,471,775 B2
(45) Date of Patent: Nov. 18, 2025

(54) OPTICAL DETECTION DEVICE AND OPERATING METHOD THEREOF

(71) Applicant: Crystalvue Medical Corporation, Taoyuan (TW)

(72) Inventors: Hsuan-Hao Chao, Tainan (TW); Sung-Yang Wei, New Taipei (TW); William Wang, Taoyuan (TW); Chung-Cheng Chou, Luzhu Township (TW)

(73) Assignee: Crystalvue Medical Corporation, Taoyuan (TW)

( * ) Notice: Subject to any disclaimer, the term of this patent is extended or adjusted under 35 U.S.C. 154(b) by 469 days.

(21) Appl. No.: 18/099,292

(22) Filed: Jan. 20, 2023

(65) Prior Publication Data

US 2023/0301509 A1    Sep. 28, 2023

Related U.S. Application Data

(60) Provisional application No. 63/323,918, filed on Mar. 25, 2022.

(51) Int. Cl.
*A61B 3/14* (2006.01)
*A61B 3/10* (2006.01)
*G02B 26/10* (2006.01)
*G02B 26/12* (2006.01)

(52) U.S. Cl.
CPC ............ *A61B 3/102* (2013.01); *A61B 3/1005* (2013.01); *G02B 26/105* (2013.01); *G02B 26/121* (2013.01)

(58) Field of Classification Search
CPC .... A61B 3/102; A61B 3/1005; G02B 26/105; G02B 26/121
USPC ........................ 351/205, 206, 210, 215, 221; 356/450–521
See application file for complete search history.

(56) References Cited

U.S. PATENT DOCUMENTS

| 8,646,913 B2 * | 2/2014 | Hayashi | G01B 9/02044 351/208 |
| 2013/0222807 A1 * | 8/2013 | Yen | G01B 9/02015 356/450 |

\* cited by examiner

*Primary Examiner* — Mahidere S Sahle
(74) *Attorney, Agent, or Firm* — Patterson + Sheridan, LLP

(57) ABSTRACT

An optical detection device and an operation method thereof is disclosed. The optical detection device includes a light source, an optical coupling element, a reference optical path modulation element and a data processing element. The light source provides an incident light. The optical coupling element divides the incident light into a reference light and a detection light and emits them to the reference optical path modulation element and the sample to be tested respectively. The reference optical path modulation element reflects the reference light and rapidly changes the light path of reference light. The optical coupling element interferes the reference light reflected by the reference optical path modulation element and the detection light reflected by the sample to be tested to generate an optical interference signal. The data processing element receives and analyzes the optical interference signal to obtain an optical detection result about the sample to be tested.

14 Claims, 12 Drawing Sheets

OPTICAL DETECTION DEVICE AND OPERATING METHOD THEREOF

CROSS REFERENCE TO RELATED APPLICATIONS

This Application is a non-provisional application claiming priority to U.S. Provisional Application 62/323,918 filed on Mar. 25, 2022, which is incorporated by reference in its entirety.

BACKGROUND OF THE INVENTION

Field of the Invention

The invention relates to optical detection; in particular, to an optical detection device applicable to an optical coherence tomography (OCT) system and an operating method thereof.

Description of the Prior Art

In general, an OCT is an optical tomography device based on the Michelson interferometer principle, which mainly uses the interference of reference light and detection light to analyze the structure of the object to be tested observes the structural properties at different depths by adjusting the optical path of the reference light.

A common reference light device can be a single one-dimensionally movable reflector or a rotating device to achieve the effect of rapidly changing the optical path. However, if a single reflector is to be used to achieve a long-distance optical path change, the moving distance of the reflector needs to be increased, resulting in an increase in measurement time and device volume.

The light needs to be refracted between the media by using the rotating device, which may cause loss of light intensity during the refraction process, and the usable range is not continuous (there will be a dead zone) and the optical path change is not linear, which will lead to practical difficulties and limitations. Furthermore, the rotating device itself has high requirements on tolerances. If the rotating shaft is not at the exact center of the rotating device, unexpected errors will be caused. Furthermore, once the medium is fixed, it is difficult to change the refractive index. Therefore, the above-mentioned problems still need to be solved urgently.

SUMMARY OF THE INVENTION

Therefore, the invention proposes an optical detection device applicable to an OCT system and an operating method thereof, which can quickly change the optical path of the reference light to speed up the sample sampling speed and/or deepen the sampling depth, so that the above-mentioned problems encountered in the prior art can be effectively solved.

An embodiment of the invention is an optical detection device operating method. In this embodiment, the optical detection device operating method is used to operate an optical detection device. The optical detection device includes a light source, an optical coupling element, a reference light optical path modulation element and a data processing element. The optical detection device operating method includes steps of: (a) the light source providing an incident light; (b) the optical coupling element dividing the incident light into a reference light and a detection light and emitting the reference light and the detection light to the reference light optical path modulation element and a sample to be tested respectively; (c) the reference light optical path modulation element reflecting the reference light and rapidly changing the optical path of the reference light; (d) the optical coupling element interfering with the reference light reflected by the reference light optical path modulation element and the detection light reflected by the sample to be tested to generate an optical interference signal; and (e) the data processing element receiving and analyzing the optical interference signal to obtain an optical detection result related to the sample to be tested.

In an embodiment, in the step (c), the reference light optical path modulation element quickly changes the optical path of the reference light by using a mechanism of translation, rotation or scaling.

In an embodiment, the reference light optical path modulation element includes a first mirror and a second mirror. An end of the first mirror has a bending portion. When the reference light enters the reference light optical path modulation element, the reference light will be reflected back and forth between the first mirror and the second mirror and then be vertically incident to the bending portion, so that the reference light reflected by the bending portion is reflected back and forth between the first mirror and the second mirror following the original path and then emitted out of the reference light optical path modulation element.

In an embodiment, the first mirror moves a unit distance, so that the reference light is reflected different times between the first mirror and the second mirror, and an optical path change of a specific multiple is generated in the optical path of the reference light.

In an embodiment, the reference light optical path modulation element includes a rotatable medium. When the medium is rotated to be vertical to the reference light, the optical path of the reference light is mainly contributed by a width of the medium; when the medium is rotated to be parallel to the reference light, the optical path of the reference light is mainly contributed by a length of the medium.

In an embodiment, the optical path of the reference light is continuously changed; the reference light passes through multiple media to increase the optical path change.

In an embodiment, the reference light optical path modulation element includes a mirror array for the reference light to be reflected in the mirror array; when the area surrounded by the mirror array increases, the optical path of the reference light increases; the mirror array is stacked into a three-dimensional structure to reduce its volume.

In an embodiment, the reference light optical path modulation element further includes a polarization control device and a meta-lens disposed on a detection optical path for measuring an axial length of an eye. The meta-lens makes two different polarized lights have different focal lengths. When measuring an anterior half of the eye, the polarization control device provides a first polarized light focused near a cornea through the meta-lens; when measuring a posterior half of the eye, the polarization control device changes to provide a second polarized light focused near a fundus through the meta-lens.

Another embodiment of the invention is an optical detection device. In this embodiment, the optical detection device includes: a light source, configured to provide an incident light; an optical coupling element, configured to divide the incident light into a reference light and a detection light and emit the reference light and the detection light to the reference light optical path modulation element and a sample to be tested respectively; a reference light optical path modulation element, configured to reflect the reference light and quickly change the optical path of the reference light, wherein the optical coupling element interferes the reference light reflected by the reference light optical path modulation element and the detection light reflected by the sample to be tested to generate an optical interference signal; and a data processing element, configured to receive the optical interference signal and analyze the optical interference signal to obtain an optical detection result related to the sample to be tested.

In an embodiment, the reference light optical path modulation element quickly changes the optical path of the reference light by using a mechanism of translation, rotation or scaling.

In an embodiment, the reference light optical path modulation element includes a first mirror and a second mirror. An end of the first mirror has a bending portion. When the reference light enters the reference light optical path modulation element, the reference light is reflected back and forth between the first mirror and the second mirror and then be vertically incident to the bending portion, so that the reference light reflected by the bending portion is reflected back and forth between the first mirror and the second mirror following the original path and then emitted out of the reference light optical path modulation element.

In an embodiment, the first mirror moves a unit distance, so that the reference light is reflected different times between the first mirror and the second mirror, and an optical path change of a specific multiple is generated in the optical path of the reference light.

In an embodiment, the reference light optical path modulation element includes a rotatable medium. When the medium is rotated to be vertical to the reference light, the optical path of the reference light is mainly contributed by a width of the medium; when the medium is rotated to be parallel to the reference light, the optical path of the reference light is mainly contributed by a length of the medium.

In an embodiment, the optical path of the reference light is continuously changed; the reference light passes through multiple media to increase the optical path change.

In an embodiment, the reference light optical path modulation element includes a mirror array for the reference light to be reflected in the mirror array; when the area surrounded by the mirror array increases, the optical path of the reference light increases; the mirror array is stacked into a three-dimensional structure to reduce its volume.

In an embodiment, the reference light optical path modulation element further includes a polarization control device and a meta-lens disposed on a detection optical path for measuring an axial length of an eye. The meta-lens makes two different polarized lights have different focal lengths. When measuring an anterior half of the eye, the polarization control device provides a first polarized light focused near a cornea through the meta-lens; when measuring a posterior half of the eye, the polarization control device changes to provide a second polarized light focused near a fundus through the meta-lens.

Compared to the prior art, the optical detection device and its operating method that can quickly change the optical path of the reference light and measure the thickness of the material (such as the axial length of the eye) proposed by the invention can be applied to an OCT system, and its advantages include: simple manufacture, miniaturization (can be folded into a three-dimensional structure), the optical path can be changed linearly through proper design (translation, rotation, scaling), no dead zone through proper design, different media can be switched to change the refractive index to change the optical path more elastically, different films can be coated to adjust the optical path of reference light with different wavelengths or polarizations, and it can be used with metamaterials to deepen the measurement range, etc. Because it can quickly change the optical path of the reference light, so as to speed up the sample sampling speed and/or deepen the sampling depth, and it is not necessary to divide into two optical paths to adjust the relative optical path lengths to measure the anterior half and the posterior half of the eye respectively, and it is not necessary to align the two optical paths with each other; therefore, the volume can be reduced and the production threshold can be lowered, so as to effectively solve the problems encountered in the prior arts.

The advantage and spirit of the invention may be understood by the following detailed descriptions together with the appended drawings.

BRIEF DESCRIPTION OF THE APPENDED DRAWINGS

Figures 10A, 10B:
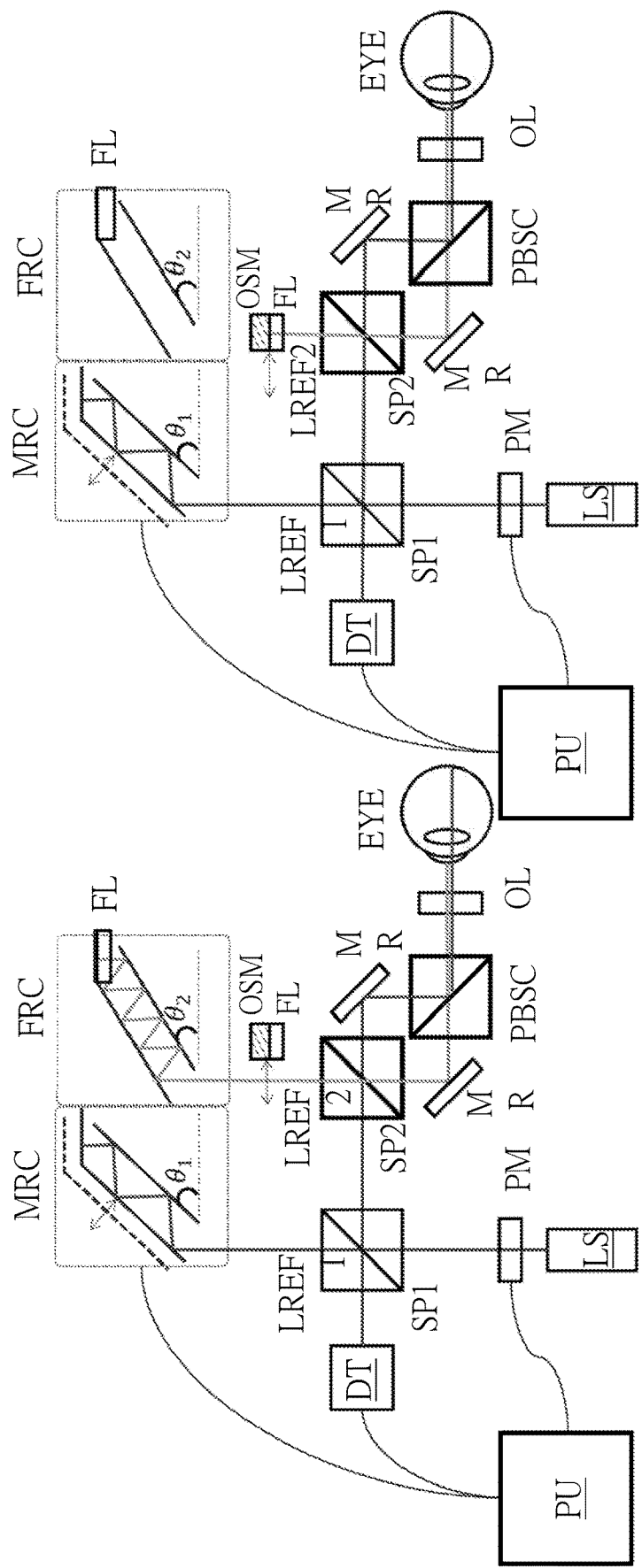

FIG. 10A and FIG. 10B illustrate schematic diagrams showing that the optical path modulation device of the invention includes a movable reference light optical path modulation element and a fixed reference light optical path modulation element and combines a translatable optical switch and an optical switch-mirror to control whether the scanning light enters the fixed reference light optical path modulation element.

Figure 11:
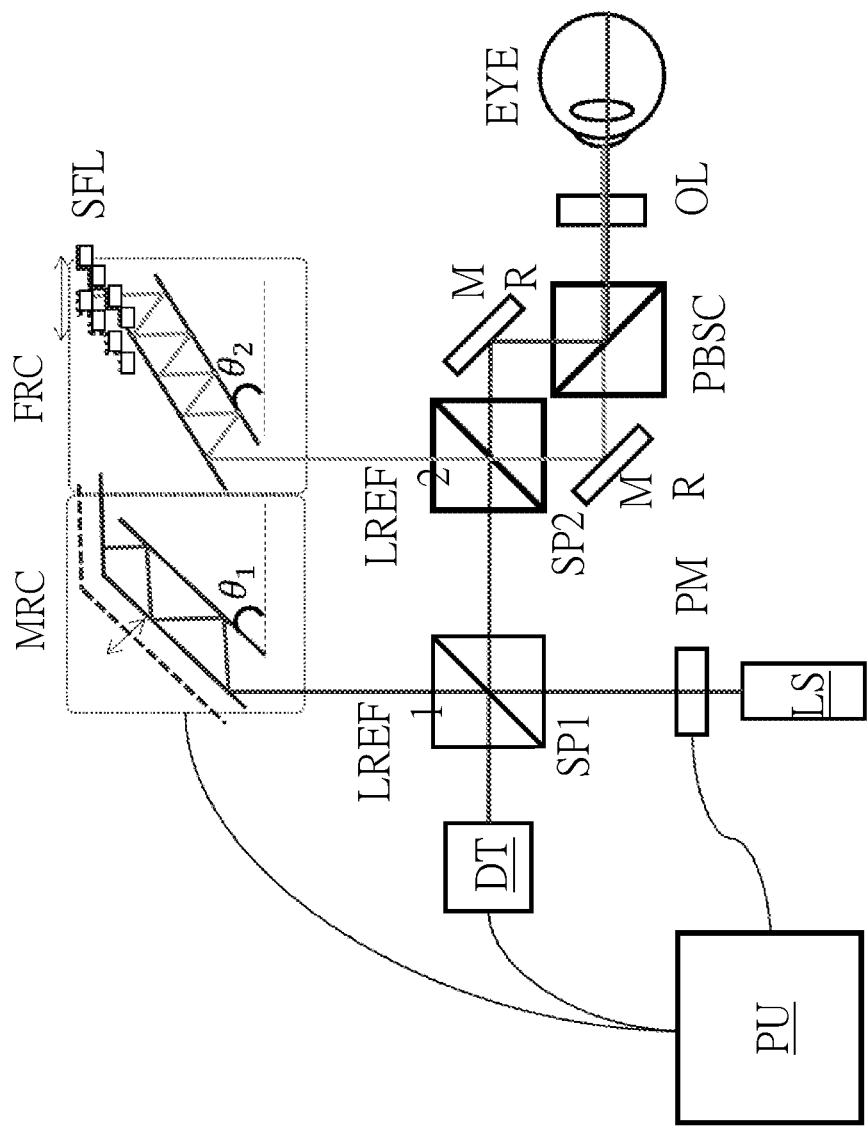

FIG. 11 illustrates a schematic diagram showing that the optical path modulation device of the invention can focus the scanning light at different depths of the eye through a serrated plane mirror including many small focus lenses combined with a translational mechanism.

Figure 12A:
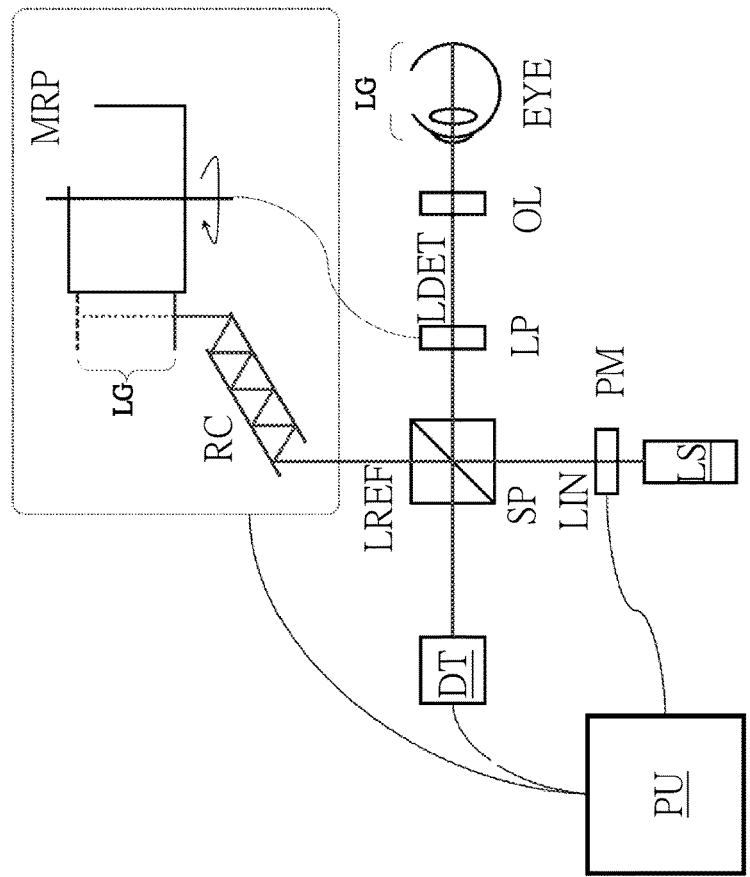

FIG. 12A illustrates a schematic diagram showing that the optical path modulation device of the present invention only needs one reference light and the rotating cube and the mirror turntable/lens turntable can adopt different gear ratios to achieve different speeds, thereby adjusting the sampling frequency of samples with different depths.

Figure 12B:
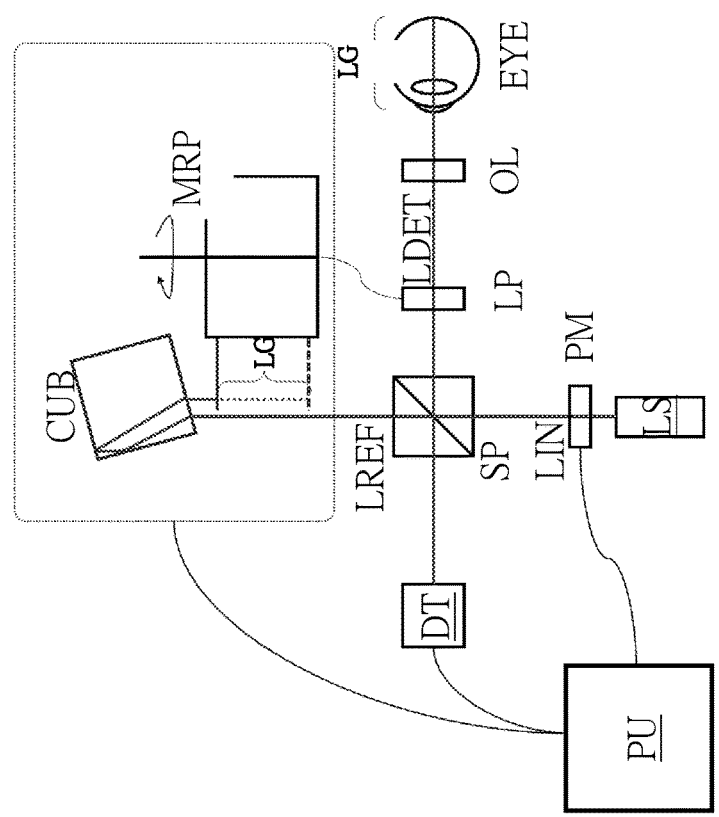

FIG. 12B illustrates a schematic diagram of the optical path modulation device of the invention using a fixed reference light optical path modulation element instead of the rotating cube in FIG. 12A.

DETAILED DESCRIPTION OF THE INVENTION

Exemplary embodiments of the invention are referenced in detail now, and examples of the exemplary embodiments are illustrated in the drawings. Further, the same or similar reference numerals of the components in the drawings and the detailed description of the invention are used on behalf of the same or similar parts.

An embodiment of the invention is an optical detection device. In fact, the optical detection device can be applied to an OCT system, because it can quickly change the optical path of the reference light to achieve the effect of speeding up the sample sampling speed and/or deepening the sampling depth, and there is no need to divide into two optical paths to adjust the relative optical path to measure the anterior half and the posterior half of the eye respectively, and there is no need to align the two optical paths with each other, so that the effect of reducing size and production threshold can be achieved.

Figure 1:
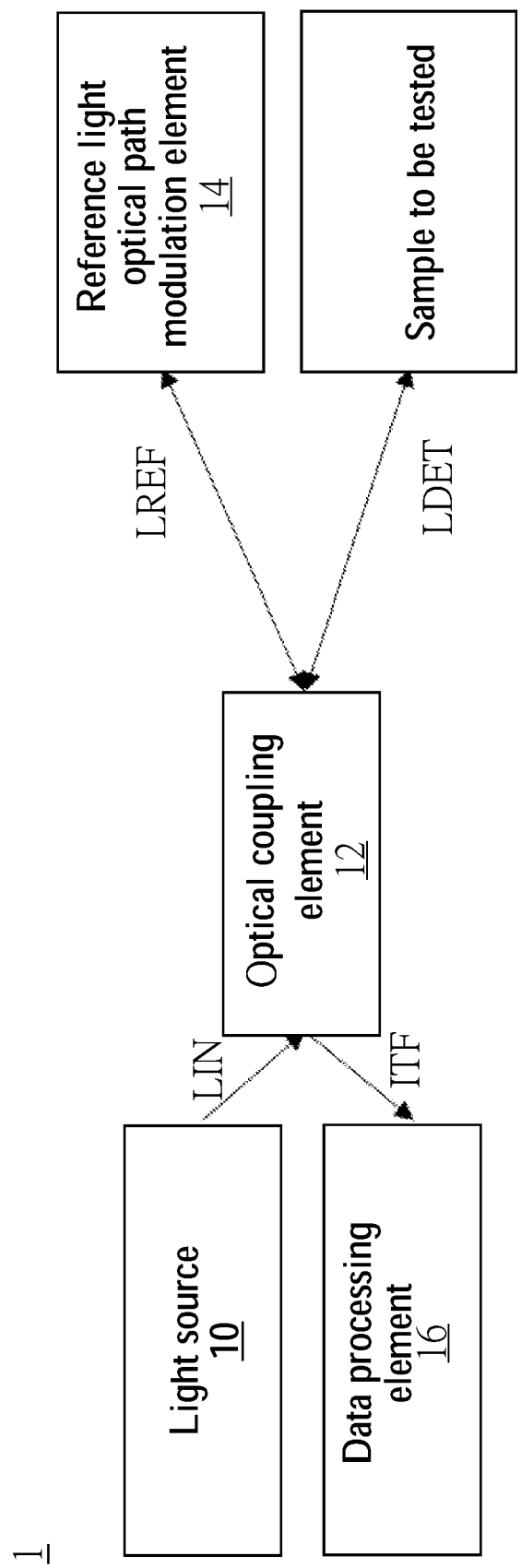
FIG. 1 illustrates a schematic diagram of an optical detection device in an embodiment of the invention.

Please refer to FIG. 1. FIG. 1 illustrates a schematic diagram of the optical detection device in this embodiment. As shown in FIG. 1, the optical detection device 1 includes a light source 10, an optical coupling element 12, a reference light optical path modulation element 14 and a data processing element 16. The light source 10 is used to provide an incident light LIN. The optical coupling element 12 is used to divide the incident light LIN into a reference light LREF and a detection light LDET and then emit the reference light LREF and the detection light LDET to the reference light optical path modulation element 14 and a sample SAM to be tested respectively. The reference light optical path modulation element 14 is used to reflect the reference light LREF and rapidly change the optical path of the reference light LREF. The optical coupling element 12 interferes with the reference light LREF reflected by the reference light optical path modulation element 14 and the detection light LDET reflected by the sample SAM to be tested to generate an optical interference signal ITF. The data processing unit 16 is used to receive the optical interference signal ITF and analyze the optical interference signal ITF to obtain an optical detection result of the sample SAM to be tested.

In practical applications, the optical coupling element 12 can be a splitter, but not limited to this. The reference light optical path modulation element 14 can use mechanisms such as translation, rotation or scaling to rapidly change the optical path of the reference light LREF, and the optical path of the reference light LREF can be continuously changed, but not limited to this. For example, the existing ophthalmic axial measuring instrument can usually measure 7 times per second. In contrast, the optical detection device of the invention can complete a scan in about 0.006-0.0015 seconds when cooperated with a general mobile platform (moving speed reaches 500-2000 mm/s); that is to say, it can measure more than 100 times in one second, so that the measurement time of the eye axis can be greatly reduced to improve the measurement efficiency.

Another embodiment of the invention is an optical detection device operating method. In this embodiment, the optical detection device operating method is used to operate the optical detection device as shown in FIG. 1; that is to say, the optical detection device can include a light source, an optical coupling element, a reference light optical path modulation element and a data processing element, but not limited to this.

Figure 2:
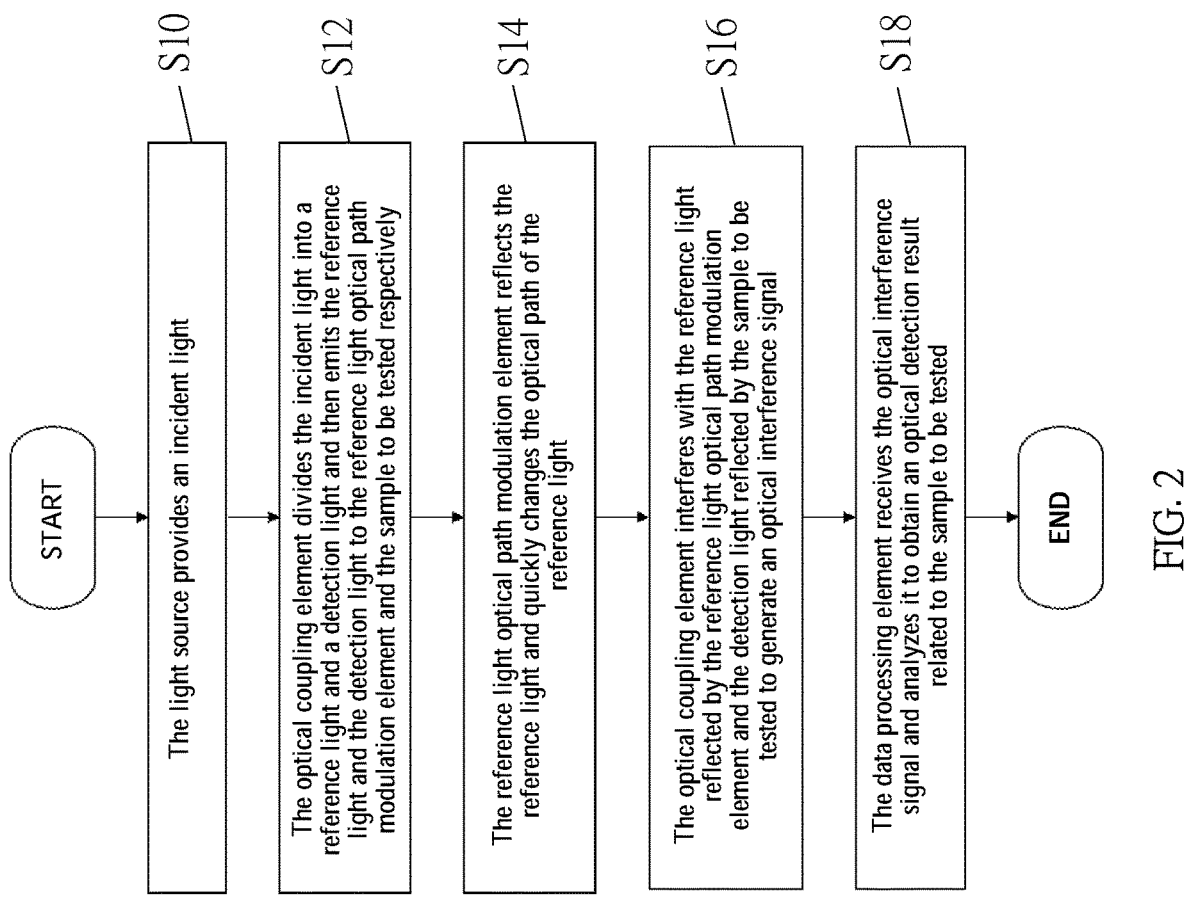
FIG. 2 illustrates a flow chart of an optical detection device operating method in another embodiment of the invention.

Please refer to FIG. 2. FIG. 2 illustrates a flow chart of the optical detection device operating method in this embodiment. As shown in FIG. 2, the optical detection device operating method includes following steps:

Step S10: the light source provides an incident light;

Step S12: the optical coupling element divides the incident light into a reference light and a detection light and then emits the reference light and the detection light to the reference light optical path modulation element and the sample to be tested respectively;

Step S14: the reference light optical path modulation element reflects the reference light and quickly changes the optical path of the reference light;

Step S16: the optical coupling element interferes with the reference light reflected by the reference light optical path modulation element and the detection light reflected by the sample to be tested to generate an optical interference signal; and Step S18: the data processing element receives the optical interference signal and analyzes it to obtain an optical detection result related to the sample to be tested.

Figure 3A:
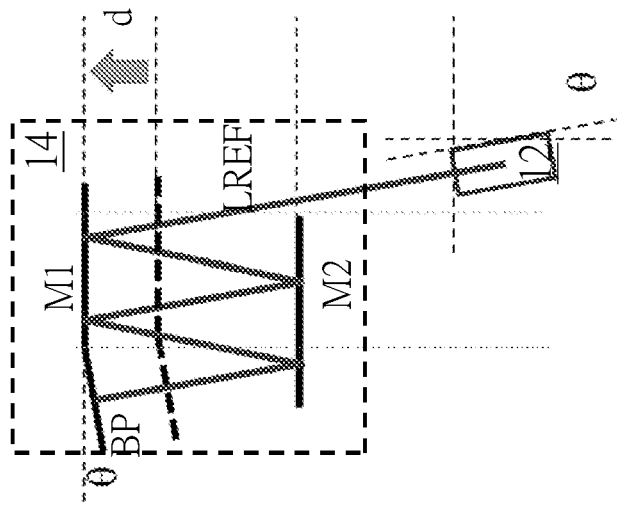
FIG. 3A and FIG. 3B illustrate schematic diagrams of reflecting the reference light between two mirrors for different times to move the reference light a unit distance to generate a specific multiple of the optical path.
Figure 3B:
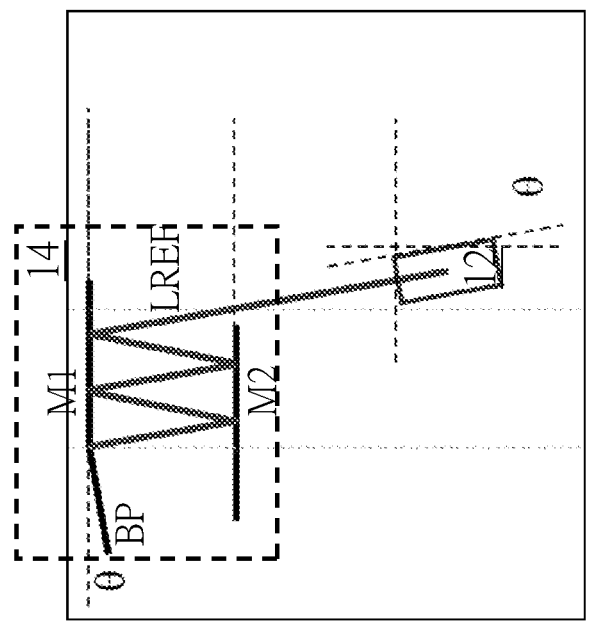

Please refer to FIG. 3A and FIG. 3B, the reference light optical path modulation element 14 includes a first mirror M1 and a second mirror M2. An end of the first mirror M1 has a bending portion BP. When the reference light LREF enters the reference light optical path modulation element 14, the reference light LREF will be reflected back and forth between the first mirror M1 and the second mirror M2 and then be vertically incident to the bending portion BP, so that the reference light LREF reflected by the bending portion BP will be reflected back and forth between the first mirror M1 and the second mirror M2 along the original path, and then be emitted out of the reference light optical path modulation element 14.

It should be noted that since the reference light LREF is reflected different times between the first mirror M1 and the second mirror M2, the reference light optical path modulation element 14 can only need to move the first mirror M1 (or The second mirror M2) the unit distance d to generate an optical path change of a specific multiple, so as to quickly change the optical path of the reference light, thereby achieving the effect of speeding up the sample sampling speed and/or deepening the sampling depth.

Figure 4:
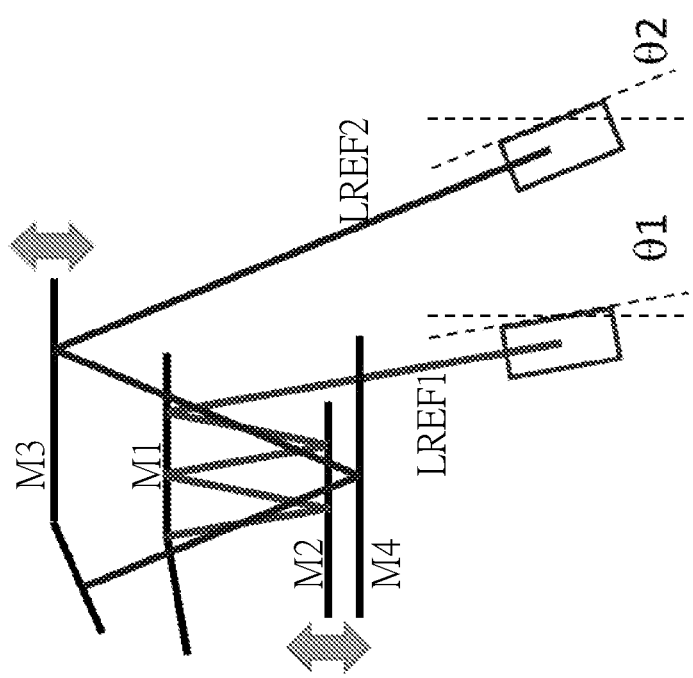
FIG. 4 illustrates a schematic diagram of each interface has different transmittance and reflectance for reference lights of different wavelengths and polarizations to simultaneously control optical paths of different light sources.

Please refer to FIG. 4, because each interface (such as the first mirror M1 and the second mirror M2, the third mirror M3 and the fourth mirror M4) has different transmittance and reflection rate for the reference lights LREF1 and LREF2 of different wavelengths and polarizations, the reference light optical path modulation element 14 can achieve the effect of simultaneously adjusting the optical paths of different light sources.

Figure 5B:
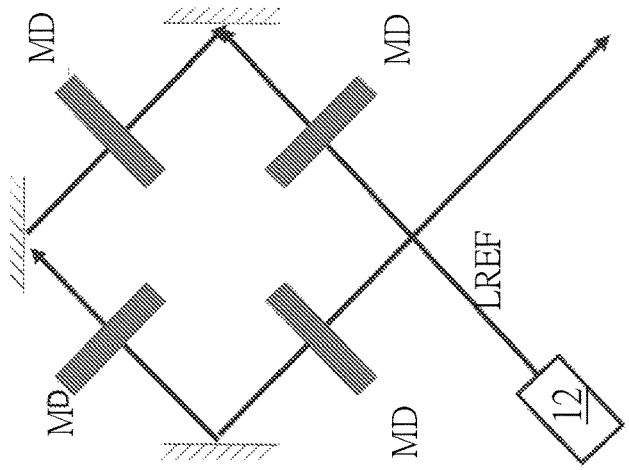
FIG. 5B illustrates a schematic diagram of increasing the optical path change by passing the reference light through multiple media.
Figure 5A:
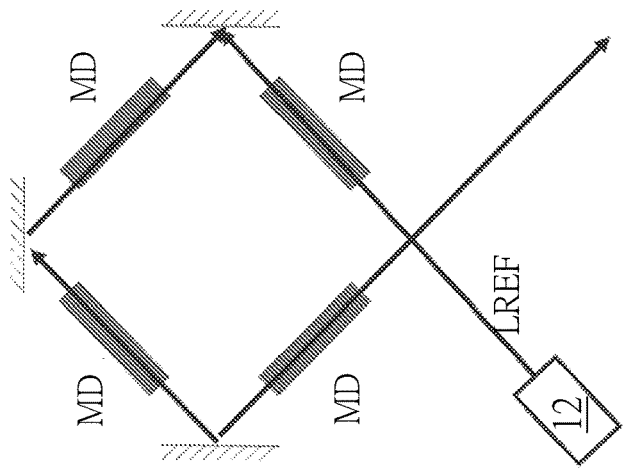
FIG. 5A illustrates a schematic diagram showing that when the medium is rotated to be vertical to the reference light, the optical path of the reference light is mainly contributed by the width of the medium; when the medium is rotated to be parallel to the reference light, the optical path of the reference light is mainly contributed by the length of the medium.
Figure 5A:
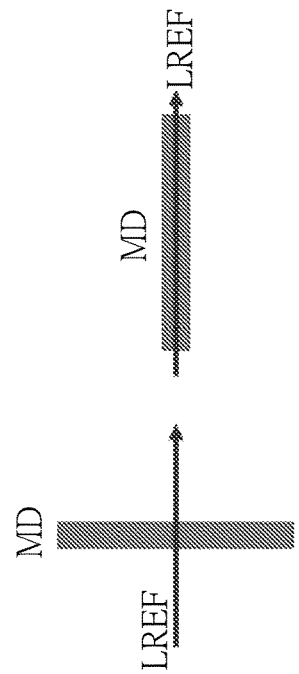

Please refer to FIG. 5A, the reference light LREF is emitted to a rotating medium MD. When the medium MD is rotated to be vertical to the reference light LREF, the optical path of the reference light LREF is mainly contributed by the width of the medium MD; when the medium MD is rotated to be parallel to the reference light LREF, the optical path of the reference light LREF is mainly contributed by the length of the medium MD. As to FIG. 5B, FIG. 5B illustrates a schematic diagram of increasing the optical path change by making the reference light LREF pass through a plurality of mediums MD. Likewise, the media MD can be rotated to be vertical or parallel to the reference light LREF.

Figure 6B:
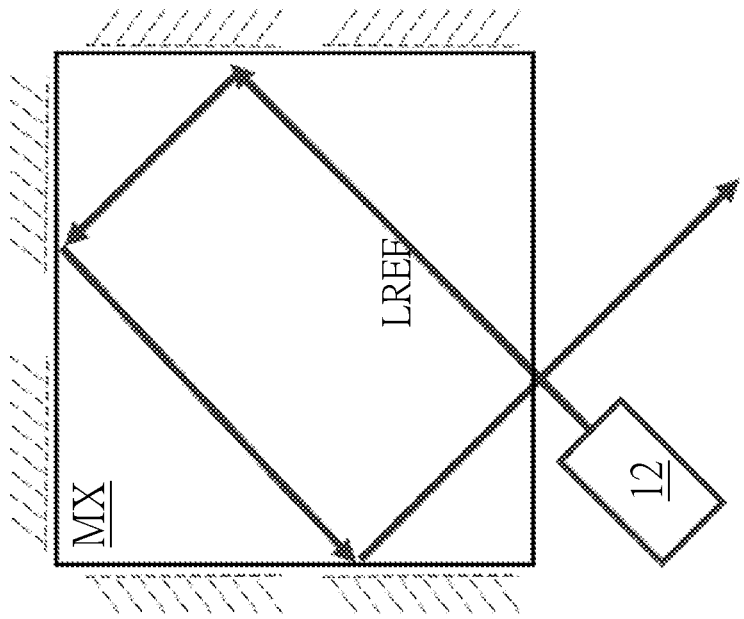
FIG. 6A and FIG. 6B illustrate schematic diagrams showing that the reference light is reflected in the mirror array, and the optical path of the reference light increases as the area surrounded by the mirror array increases.
Figure 6A:
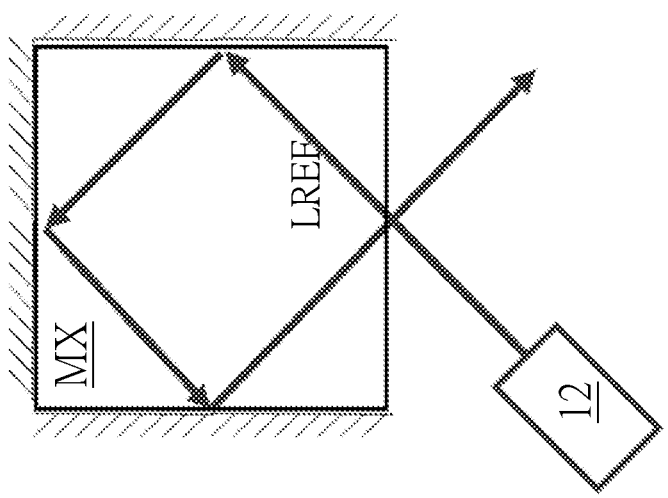

Please refer to FIG. 6A and FIG. 6B, the area surrounded by a mirror array MX can be reduced (as shown in FIG. 6A) or increased (as shown in FIG. 6B). The reference light LREF can be reflected in the mirror array MX, and the optical path of the reference light LREF will increase as the area surrounded by the mirror array MX increases; that is to say, the optical path of the reference light LREF in FIG. 6B will be longer than the optical path of the reference light LREF in FIG. 6A, but not limited to this.

Figure 7:
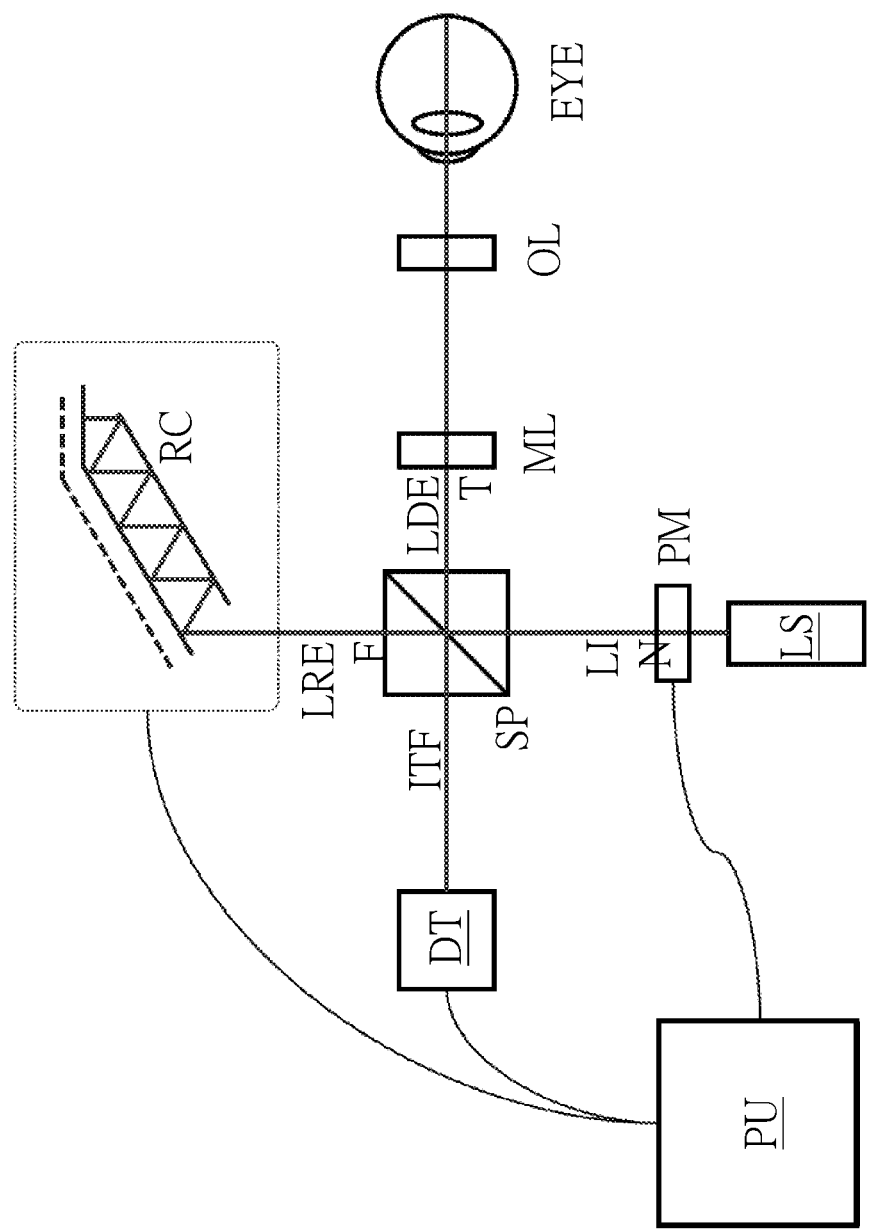
FIG. 7 illustrates a schematic diagram showing that the optical path modulation device of the invention has an OCT architecture and the reference light optical path modulation element includes a polarization control device and a meta-lens disposed on the detection optical path to measure the axial length of the eye.

Please refer to FIG. 7. FIG. 7 illustrates a schematic diagram showing that the optical path modulation device of the invention has an OCT architecture and the reference light optical path modulation element includes a polarization control device and a meta-lens disposed on the detection optical path to measure the axial length of the eye. As shown in FIG. 7, the processing unit PU is coupled to the polarization control device PM and the detector DT respectively. The optical coupling element SP is disposed between the detector DT and the eyeball EYE. The meta-lens ML and the eyepiece OL are disposed on the detection optical path between the optical coupling element SP and the eyeball EYE. The optical coupling element SP and the polarization control device PM are disposed between the reference light optical path modulation element RC and the light source LS.

After proper design of the meta-lens ML, two different polarized lights (for example, horizontally polarized and vertically polarized) can have different focal lengths. The reference light optical path modulation element RC only needs to move 3 mm to scan the entire axial length of the eyeball. By means of the meta-lens ML and the polarization control device PM, certain polarized light (for example, horizontally polarized light) can be used to measure the anterior half of the eyeball EYE and focused near the cornea through the meta-lens ML. With the operation of the reference light optical path modulation element RC, the optical path increases. When measuring the posterior half of the eyeball EYE, the polarization control device PM changes to another polarized light (such as vertically polarized light) and focuses near the fundus through the meta-lens ML.

In this way, it does not need to divide into two optical paths to adjust the relative optical paths to measure the anterior half area and the posterior half area of the eyeball EYE, and does not need to carry out alignment of the two optical paths, so it can achieve the effect of reducing the volume and lowering the production threshold.

In another embodiment, the polarization control device PM of the invention can also fix the light source at a specific linear polarization. After passing through the meta-lens ML, the horizontal polarization component and the vertical polarization component are respectively focused near the cornea and the fundus, and then reflected to the optical coupling element SP to interfere with the reference light LREF. In this way, in addition to the above-mentioned advantages, dynamic control of polarization is also not required.

In still another embodiment, the invention can also use horizontal polarization and vertical polarization to scan the entire axial length of the eyeball once, and then extract the segment with better signal and analyze it to obtain the axial length of the eyeball.

Figures 8A, 8B:
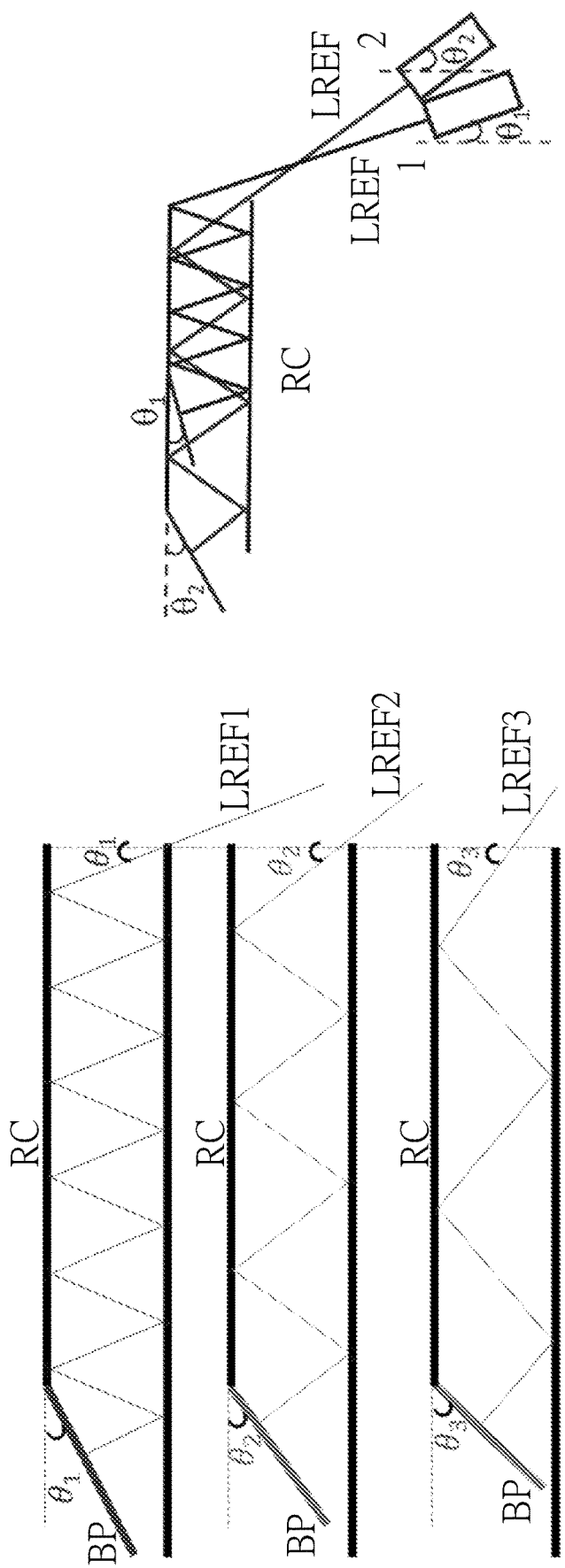
FIG. 8A illustrates a schematic diagram of changing the optical path length by rotating the mirror angle of the invention.
FIG. 8B illustrates a schematic diagram of changing the optical path length by changing the incident angle of the invention.

Please refer to FIG. 8A and FIG. 8B, the invention can adjust the incident angles θ1~θ3 of the reference light LREF1~LREF2 incident to the reference light optical path modulation element RC and correspondingly rotate the angles θ1~θ3 of the bending portion BP of the reference light optical path modulation element RC to change the optical path length of the reference light without moving the mirror in parallel, but not limited to this.

This embodiment can also be combined with the foregoing embodiments, using different wavelengths, polarizations, etc., which can have different transmittance and reflectivity interfaces with rotating mirrors and are installed in the reference light optical path modulation element to achieve the effect of simultaneously adjusting the optical path length of different wavelengths and polarized light sources. In addition, the invention can also adjust the optical path of different wavelengths and polarized light sources by fixing the incident angle and rotating the corresponding angle of the mirror to achieve the desired fixed optical path length, so as to improve the convenience of use.

Figures 9A, 9B:
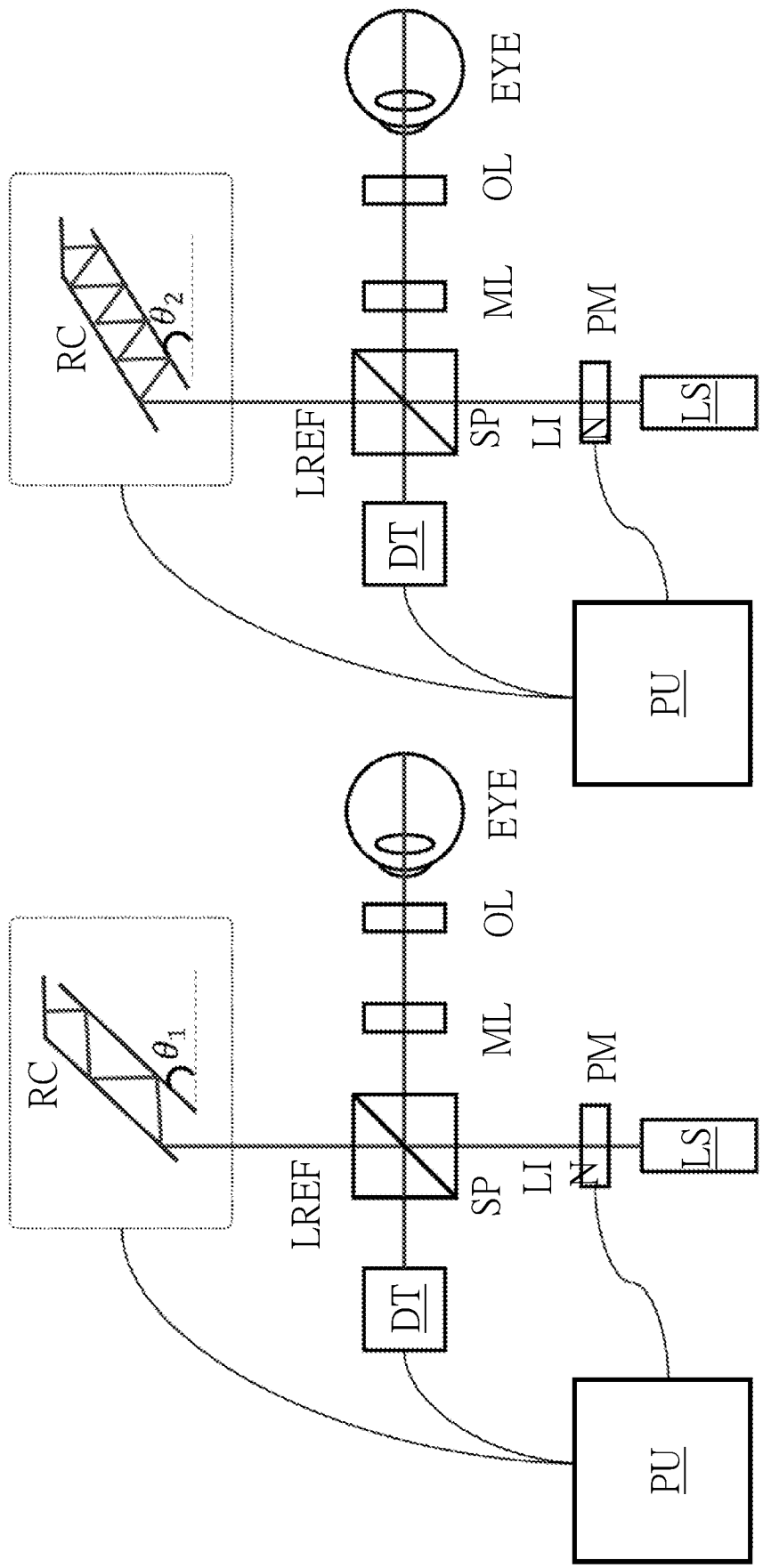
FIG. 9A and FIG. 9B illustrate schematic diagrams showing that the reference light optical path modulation element of the invention can scan the entire axial length of the eye by changing the angle of the parallel mirror without translating the mirror.

Please refer to FIG. 9A and FIG. 9B, the reference light optical path modulation element RC of the invention can also achieve the scanning of the whole eyeball axial length by changing the angle θ1~θ3 of the parallel mirror without moving the mirror in parallel, but not limited to this.

Please refer to FIG. 10A and FIG. 10B, the optical path modulation device of the invention includes a movable reference light optical path modulation element MRC and a fixed reference light optical path modulation element FRC combined with a translatable optical switch and an optical switch-mirror OSM to control whether the second reference light LREF2 enters the fixed reference light optical path modulation element FRC.

When the optical path difference needs to be fixed, the incident angle of the reference light optical path modulation element RC can be fixed to form a fixed reference light optical path modulation element FRC. The fixed reference light optical path modulation element FRC is combined with the translational optical switch-mirror OSM, and can be controlled by the same motor with the movable reference light optical path modulation element MRC. The optical switch-mirror OSM can control whether the scanning light (the second reference light LREF2) enters the fixed reference light optical path modulation element FRC.

In this embodiment, instead of using the meta-lens ML, two polarizing beam splitters PBSC can be used to change the scanning optical path, so that the scanning lights with different polarizations can be focused on the cornea and the retina respectively. When the optical switch-mirror OSM is turned on, the scanning light (the second reference light LREF2) can enter the fixed reference light optical path modulation element FRC and pass through the focus lens FL inside the fixed reference light optical path modulation element FRC), which can focus the scanning light on the anterior half of the eyeball EYE. When the optical switch-mirror OSM is closed, the scanning light (the second reference light LREF2) will be reflected by the optical switch-mirror OSM and cannot enter the fixed reference light optical path modulation element FRC, and the scanning light (the second reference light LREF2) through the focusing lens FL, it can focus on the posterior half area of the eyeball EYE. In this way, the second reference light LREF2 can have the same optical path with the scanning light focused on the anterior half area and the posterior half area of the eyeball EYE at different times in this embodiment, so as to generate interference signals.

Please refer to FIG. 11, when the fixed reference light path modulation element FRC needs to fine-tune the light path, the reference light path modulation element RC of the invention can include serrated flat mirrors with many small focus lens (SFL) combined with a translational mechanism (which can be controlled by the same motor with the movable reference light path modulation element MRC), these small focus lens SFL can focus the scanning light (the second reference light LREF2) on the position of different depths of the eyeball EYE. In this way, the second reference light LREF2 and the scanning light focused at different depths of the eyeball EYE can have the same optical path at different times in this embodiment to generate interference signals.

Please refer to FIG. 12A, the optical path modulation device of this embodiment can only need one reference light LREF and the rotating cube CUB and the mirror turntable MRP/lens turntable LP for modulating optical path can adopt different gear ratios to achieve different rotating speeds, so as to adjust the sampling frequency of samples at different depths to measure the eye axial length LG. There are multiple non-overlapping mirrors on the mirror turntable MRP, and each mirror is properly disposed at various depths (there are the same depth and different depths). Different and switchable large optical path changes can be achieved when the mirror turntable MRP rotates. The mirror turntable MRP and the lens turntable LP are linked 1:1 by simple gears. There are multiple lenses with different focal lengths on the lens turntable LP, so that the detection light LDET with the same optical path as the reference light LREF can be focused at an appropriate sample depth.

For example: when adjusting the gear ratio so that the rotating cube CUB turns 1 unit angle, the mirror turntable MRP and the lens turntable LP turn 5 unit angles, and make the optical path and focal length change 10 times, assuming there are only 2 sampling depths, each depth can be sampled 5 times, but not limited to this.

Please refer to FIG. 12B. In another embodiment, the rotating cube CUB in FIG. 12A can also be replaced by a fixed reference light optical path modulation element RC. The rest can be deduced in the same way, and will not be repeated here.

Compared to the prior art, the optical detection device and its operating method that can quickly change the optical path of the reference light and measure the thickness of the material (such as the axial length of the eye) proposed by the invention can be applied to an OCT system, and its advantages include: simple manufacture, miniaturization (can be folded into a three-dimensional structure), the optical path can be changed linearly through proper design (translation, rotation, scaling), no dead zone through proper design, different media can be switched to change the refractive index to change the optical path more elastically, different films can be coated to adjust the optical path of reference light with different wavelengths or polarizations, and it can be used with metamaterials to deepen the measurement range, etc. Because it can quickly change the optical path of the reference light, so as to speed up the sample sampling speed and/or deepen the sampling depth, and it is not necessary to divide into two optical paths to adjust the relative optical path lengths to measure the anterior half and the posterior half of the eye respectively, and it is not necessary to align the two optical paths with each other; therefore, the volume can be reduced and the production threshold can be lowered, so as to effectively solve the problems encountered in the prior arts.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An optical detection device operating method, used to operate an optical detection device, the optical detection device comprising a light source, an optical coupling element, a reference light optical path modulation element and a data processing element, the optical detection device operating method comprising steps of:
    (a) the light source providing an incident light;
    (b) the optical coupling element dividing the incident light into a reference light and a detection light and emitting the reference light and the detection light to the reference light optical path modulation element and a sample to be tested respectively;
    (c) the reference light optical path modulation element reflecting the reference light and rapidly changing an optical path of the reference light;
    (d) the optical coupling element interfering with the reference light reflected by the reference light optical path modulation element and the detection light reflected by the sample to be tested to generate an optical interference signal; and
    (e) the data processing element receiving and analyzing the optical interference signal to obtain an optical detection result related to the sample to be tested;
    wherein the reference light optical path modulation element comprises a first mirror and a second mirror, and an end of the first mirror has a bending portion, when the reference light enters the reference light optical path modulation element, the reference light is reflected back and forth between the first mirror and the second mirror and then is vertically incident to the bending portion, so that the reference light reflected by the bending portion is reflected back and forth between the first mirror and the second mirror following the original path and then emitted out of the reference light optical path modulation element.

2. The optical detection device operating method of claim 1, wherein in the step (c), the reference light optical path modulation element quickly changes the optical path of the reference light by using a mechanism of translation, rotation or scaling.

3. The optical detection device operating method of claim 1, wherein the first mirror moves a unit distance, so that the reference light is reflected different times between the first mirror and the second mirror, and an optical path change of a specific multiple is generated in the optical path of the reference light.

4. The optical detection device operating method of claim 1, wherein the reference light optical path modulation element comprises a rotatable medium, when the medium is rotated to be vertical to the reference light, the optical path of the reference light is mainly contributed by a width of the medium; when the medium is rotated to be parallel to the reference light, the optical path of the reference light is mainly contributed by a length of the medium.

5. The optical detection device operating method of claim 4, wherein the optical path of the reference light is continuously changed; the reference light passes through multiple media to increase the optical path change.

6. The optical detection device operating method of claim 1, wherein the reference light optical path modulation element comprises a mirror array for the reference light to be reflected in the mirror array; when the area surrounded by the mirror array increases, the optical path of the reference light increases; the mirror array is stacked into a three-dimensional structure to reduce its volume.

7. The optical detection device operating method of claim 1, wherein the reference light optical path modulation element further comprises a polarization control device and a meta-lens disposed on a detection optical path for measuring an axial length of an eye; the meta-lens makes two different polarized lights have different focal lengths; when measuring an anterior half of the eye, the polarization control device provides a first polarized light focused near a cornea through the meta-lens; when measuring a posterior half of the eye, the polarization control device changes to provide a second polarized light focused near a fundus through the meta-lens.

8. An optical detection device, comprising:
a light source, configured to provide an incident light;
an optical coupling element, configured to divide the incident light into a reference light and a detection light and emit the reference light and the detection light to the reference light optical path modulation element and a sample to be tested respectively;
a reference light optical path modulation element, configured to reflect the reference light and quickly change the optical path of the reference light, wherein the optical coupling element interferes the reference light reflected by the reference light optical path modulation element and the detection light reflected by the sample to be tested to generate an optical interference signal; and
a data processing element, configured to receive the optical interference signal and analyze the optical interference signal to obtain an optical detection result related to the sample to be tested;
wherein the reference light optical path modulation element comprises a first mirror and a second mirror, and an end of the first mirror has a bending portion; when the reference light enters the reference light optical path modulation element, the reference light is reflected back and forth between the first mirror and the second mirror and then is vertically incident to the bending portion, so that the reference light reflected by the bending portion is reflected back and forth between the first mirror and the second mirror following the original path and then emitted out of the reference light optical path modulation element.

9. The optical detection device of claim 8, wherein the reference light optical path modulation element quickly changes the optical path of the reference light by using a mechanism of translation, rotation or scaling.

10. The optical detection device of claim 8, wherein the first mirror moves a unit distance, so that the reference light is reflected different times between the first mirror and the second mirror, and an optical path change of a specific multiple is generated in the optical path of the reference light.

11. The optical detection device of claim 8, wherein the reference light optical path modulation element comprises a rotatable medium, when the medium is rotated to be vertical to the reference light, the optical path of the reference light is mainly contributed by a width of the medium; when the medium is rotated to be parallel to the reference light, the optical path of the reference light is mainly contributed by a length of the medium.

12. The optical detection device of claim 11, wherein the optical path of the reference light is continuously changed; the reference light passes through multiple media to increase the optical path change.

13. The optical detection device of claim 8, wherein the reference light optical path modulation element comprises a mirror array for the reference light to be reflected in the mirror array; when the area surrounded by the mirror array increases, the optical path of the reference light increases; the mirror array is stacked into a three-dimensional structure to reduce its volume.

14. An optical detection device, comprising:
a light source, configured to provide an incident light;
an optical coupling element, configured to divide the incident light into a reference light and a detection light and emit the reference light and the detection light to the reference light optical path modulation element and a sample to be tested respectively;
a reference light optical path modulation element, configured to reflect the reference light and quickly change the optical path of the reference light, wherein the optical coupling element interferes the reference light reflected by the reference light optical path modulation element and the detection light reflected by the sample to be tested to generate an optical interference signal; and
a data processing element, configured to receive the optical interference signal and analyze the optical interference signal to obtain an optical detection result related to the sample to be tested;
wherein the reference light optical path modulation element further comprises a polarization control device and a meta-lens disposed on a detection optical path for measuring an axial length of an eye; the meta-lens makes two different polarized lights have different focal lengths; when measuring an anterior half of the eye, the polarization control device provides a first polarized light focused near a cornea through the meta-lens; when measuring a posterior half of the eye, the polarization control device changes to provide a second polarized light focused near a fundus through the meta-lens.

\* \* \* \* \*